US012671175B2

(12) United States Patent
Bieber et al.

(10) Patent No.: US 12,671,175 B2
(45) Date of Patent: Jun. 30, 2026

(54) ANTENNA AND METHOD

(71) Applicant: Telefonaktiebolaget LM Ericsson (publ), Stockholm (SE)

(72) Inventors: Robert Bieber, Rosenheim (DE); Jan Sandberg, Frillesås (SE); Oskar Talcoth, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 519 days.

(21) Appl. No.: 18/027,958

(22) PCT Filed: Aug. 9, 2021

(86) PCT No.: PCT/EP2021/072171

§ 371 (c)(1),
(2) Date: Mar. 23, 2023

(87) PCT Pub. No.: WO2022/063479

PCT Pub. Date: Mar. 31, 2022

(65) Prior Publication Data

US 2024/0030617 A1 Jan. 25, 2024

(30) Foreign Application Priority Data

Sep. 25, 2020 (WO) ................. PCT/EP2020/076996

(51) Int. Cl.
*H01Q 3/18* (2006.01)
*H01Q 1/00* (2006.01)
(Continued)

(52) U.S. Cl.
CPC ............... *H01Q 3/18* (2013.01); *H01Q 1/005* (2013.01); *H01Q 1/18* (2013.01); *H01Q 15/16* (2013.01); *H01Q 19/193* (2013.01)

(58) Field of Classification Search
CPC ............. H01Q 3/18; H01Q 13/02–065; H01Q 19/132–134; H01Q 1/005; H01Q 1/18; H01Q 15/16
See application file for complete search history.

(56) References Cited

U.S. PATENT DOCUMENTS 2,895,132 A * 7/1959 Farmer .................... H01Q 3/18 343/781 R
2,961,656 A * 11/1960 Gipe ...................... H03C 7/022 342/361
(Continued)

FOREIGN PATENT DOCUMENTS

CN 101809817 A 8/2010
CN 103907240 A 7/2014
(Continued)

OTHER PUBLICATIONS

International Search Report and Written Opinion for International Patent Application No. PCT/EP2021/072171, mailed Feb. 22, 2022, 20 pages.
(Continued)

*Primary Examiner* — Ab Salam Alkassim, Jr.
(74) *Attorney, Agent, or Firm* — Withrow & Terranova, PLLC

(57) ABSTRACT

We generally describe an antenna, in particular a parabolic antenna, comprising: a primary reflector, in particular a parabolic dish, a feed antenna and/or a secondary reflector for transmitting and/or reflecting an electromagnetic wave towards the primary reflector and/or receiving a said electromagnetic wave reflected from the primary reflector, a feed coupled to the feed antenna and/or secondary reflector, wherein the feed antenna and/or secondary reflector is coupleable, via the feed, to a radio-frequency transmission and/or reception device, and an actuator unit coupled to one or more of the feed antenna, the secondary reflector and the
(Continued)

feed, wherein the actuator unit is configured to move the feed antenna and/or the secondary reflector, by exerting a mechanical force on the feed antenna and/or the secondary reflector and/or the feed, relative to the primary reflector.

21 Claims, 15 Drawing Sheets

(51) Int. Cl.
*H01Q 1/18* (2006.01)
*H01Q 15/16* (2006.01)
*H01Q 19/19* (2006.01)

(56) References Cited

U.S. PATENT DOCUMENTS

| | | | | |
|---|---|---|---|---|
| 4,755,825 | A * | 7/1988 | Crochet | H01Q 3/20 343/757 |
| 4,897,663 | A * | 1/1990 | Kusano | H01Q 19/13 343/786 |
| 6,310,583 | B1 * | 10/2001 | Saunders | H01Q 13/02 343/786 |
| 6,577,282 | B1 * | 6/2003 | Rao | H01Q 3/18 343/781 CA |
| 6,943,750 | B2 * | 9/2005 | Brooker | H01Q 3/18 343/781 CA |
| 8,314,745 | B2 * | 11/2012 | Omuro | H01Q 19/13 343/781 R |
| 10,249,960 | B2 * | 4/2019 | Thomas | H01Q 1/007 |
| 11,489,259 | B2 * | 11/2022 | Mitchelson | H01P 1/207 |
| 11,705,630 | B1 * | 7/2023 | Chiang | H01Q 3/20 343/702 |
| 2002/0075197 | A1 * | 6/2002 | Shrader | H01Q 19/19 343/840 |
| 2005/0259026 | A1 | 11/2005 | Cook | |
| 2008/0204342 | A1 * | 8/2008 | Kharadly | H01Q 1/02 343/781 R |
| 2013/0300621 | A1 * | 11/2013 | Brandau | H01Q 15/16 343/781 CA |
| 2013/0321204 | A1 * | 12/2013 | Zahavi | H01Q 3/26 342/368 |
| 2014/0104125 | A1 * | 4/2014 | Choiniere | H01Q 3/18 343/761 |
| 2014/0321204 | A1 | 10/2014 | Yang | |
| 2016/0056537 | A1 * | 2/2016 | Guler | H01Q 13/02 343/762 |
| 2017/0005415 | A1 * | 1/2017 | Adada | H01Q 3/20 |
| 2017/0207528 | A1 * | 7/2017 | Lundstedt | H01Q 15/16 |
| 2019/0020112 | A1 * | 1/2019 | Luo | H01Q 19/19 |
| 2020/0212534 | A1 * | 7/2020 | Brossier | H01Q 3/245 |
| 2023/0155297 | A1 * | 5/2023 | Saraf | H01Q 3/18 343/761 |
| 2023/0369776 | A1 * | 11/2023 | Johansson | H01Q 3/20 |

FOREIGN PATENT DOCUMENTS

| | | | | | |
|---|---|---|---|---|---|
| CN | 204538180 | U | | 8/2015 | |
| CN | 109478725 | A | | 3/2019 | |
| DE | 4307675 | A1 | | 9/1993 | |
| EP | 2565984 | A1 | | 3/2013 | |
| GB | 1179392 | A | * | 1/1970 | H01Q 13/02 |
| KR | 20040057306 | A | | 7/2004 | |
| KR | 102113042 | B1 | | 5/2020 | |
| WO | 2018041832 | A1 | | 3/2018 | |

OTHER PUBLICATIONS

First Office Action for Chinese Patent Application No. 202180065237.6, mailed Nov. 24, 2025, 32 pages.
Second Office Action for Chinese Patent Application No. 202180065237.6, mailed Apr. 17, 2026, 30 pages.

* cited by examiner

ANTENNA AND METHOD

This application is a 35 U.S.C. § 371 national phase filing of International Application No. PCT/EP2021/072171, filed Aug. 9, 2021, which claims the benefit of International Application No. PCT/EP2020/076996, filed Sep. 25, 2020, the disclosures of which are incorporated herein by reference in their entireties.

TECHNICAL FIELD

This invention generally relates to an antenna, in particular a parabolic antenna, a system comprising an antenna and an inertial measurement unit, and a method for compensating physical movement of an antenna during beam steering. In some examples, the invention relates to steering a reflector antenna beam by bending a flexible waveguide.

BACKGROUND

A backhaul point-to-point microwave link antenna may generally be mounted at an antenna mast or tower. Wind may induce a sway and/or twist motion of the antenna mast or tower. This may cause the main beam direction of the backhaul antenna to move according to the sway and/or twist of the mast/tower. If the antenna main beam width is narrower than a certain threshold and the mast/tower motions are strong enough, then the link budged of the microwave link may deteriorate because the main beam may miss the antenna of the backhaul remote station. An increase in antenna gain may result in a decrease in beam width, resulting in a high(er) sensitivity to misalignment.

For wind compensation, at least an actuation of +/−1 degree at 1 Hz may be needed.

Furthermore, sunshine may also cause concrete masts or towers sway by heating and expanding only the sunlit side of the mast/tower. This may create daily oscillations.

The prior art aims to address the above problems by steering the main beam, to counter the mast/tower sway and twist accordingly, by rotating the main reflector around its focal point, by rotating the whole antenna and radio complex, by exploiting an active electronically scanned array or a passive electronically scanned array.

SUMMARY

The inventors have realized that various problems exist with the solutions implemented in the prior art. In particular, when the main reflector is rotated around its focal point, this may result in high energy consumption of powerful actuators which are needed in order to rotate the heavy main reflector. When the whole antenna and radio complex is rotated, again, powerful actuators may be needed in order to rotate the heavy combination of the whole antenna and radio complex, thereby resulting in high energy consumption of the actuators. Using powerful actuators further results in these solutions being comparatively expensive.

Solutions based on active or passive electronically scanned arrays are also comparatively expensive.

It is therefore an object of the present disclosure to provide an improved antenna and a method used to address the above-identified problems.

The invention is set out in the independent claims. Preferred embodiments of the invention are outlined in the dependent claims.

We describe an antenna, in particular a parabolic antenna, comprising a primary reflector, in particular a parabolic dish.

The antenna further comprises a feed antenna and/or a secondary reflector for transmitting and/or reflecting an electromagnetic wave towards the primary reflector and/or receiving a said electromagnetic wave reflected from the primary reflector. Furthermore, the antenna comprises a feed coupled to the feed antenna and/or secondary reflector, wherein the feed antenna and/or secondary reflector is coupleable, via the feed, to a radio-frequency transmission and/or reception device. The antenna further comprises an actuator unit coupled to one or more of the feed antenna, the secondary reflector and the feed. The actuator unit is configured to move the feed antenna and/or the secondary reflector, by exerting a mechanical force on the feed antenna and/or the secondary reflector and/or the feed, relative to the primary reflector.

Moving the feed antenna and/or the secondary reflector may refer to changing a position and/or an orientation of the feed antenna and/or the secondary reflector, relative to the position and/or orientation of the primary reflector.

Exerting a mechanical force by the actuator unit on the feed antenna and/or the secondary reflector and/or the feed may, in some examples, relate to exerting a directional force and/or rotational force.

The feed antenna and/or the secondary reflector may be arranged at a focal point of the primary reflector, which may, in some examples, be a parabolic reflector or dish.

The feed of the antenna may, in some examples, comprise a waveguide or a coaxial cable transmission line. A waveguide may be preferable since it allows for transmitting dual modes (two perpendicular polarized modes which can be transmitted in free space).

The feed may be mechanically coupled or connected to the radio-frequency transmission and/or reception device.

The feed antenna may be comprised in any one of the example implementations of the antenna described throughout the present disclosure.

In some examples, the antenna comprises a said radio-frequency transmission and/or reception device.

Throughout the present disclosure, a coupling of one entity to another entity (e.g. feed coupled to the feed antenna and/or secondary reflector) may relate to a physical (mechanical) coupling between the entities.

Providing an antenna according to example implementations as described herein allows for only a very low mass (of the feed and/or the feed antenna and/or the secondary reflector) having to be moved by the actuator unit. When moving a low mass (compared to a rather large mass as in the solutions according to the prior art), the actuators used may be smaller, cheaper and consume less power. A lower mass also allows for faster movements in order to compensate faster for mast/tower sway motions. The direction of the main beam of the antenna may be changed according to the movement of the secondary reflector and/or feed antenna, so that this beam steering may be used in order to mitigate mast/tower sway and/or twist.

Furthermore, the actuator unit may be easily shielded from outside elements (for example rain), as it may, due to its small size, be provided within the antenna which may already be shielded by the primary reflector (in some examples the radome of the primary reflector).

In some examples of the antenna, the feed extends along an axis normal or substantially normal to a surface of the primary (e.g. dish) reflector, and wherein the actuator unit is configured to move the feed antenna and/or the secondary reflector in a direction or plane perpendicular or generally perpendicular (e.g. with a (compared to the movement in the plane relatively small) movement in the direction perpendicular to the plane) to the axis. The actuator unit may hereby be configured to move the feed antenna and/or the secondary reflector based on multiple actuators being arranged and spaced apart from each other around the feed and/or the feed antenna and/or the secondary reflector. This may advantageously allow for particularly precisely compensating for the mast/tower sway in different directions. The actuator unit may be configured to move the feed antenna and/or the secondary reflector in one or two dimensions.

In some examples of the antenna, the feed comprises a flexible feed which is configured to be bent based on the actuator unit exerting a said mechanical force on the feed antenna and/or the secondary reflector and/or the feed for moving the feed antenna and/or the secondary reflector relative to the primary reflector. The flexible feed may be bent by the actuator unit repeatedly. By bending the flexible feed, its end which is attached to the secondary reflector and/or feed antenna may be moved in the area around the primary reflector focus. The direction of the main beam of the antenna may thereby be changed according to the movement of the secondary reflector and/or feed antenna, so that this beam steering may be used in order to mitigate mast/tower sway and/or twist, while only moving relatively low mass components of the antenna. By carefully designing the shape and material of the flexible feed, one can make sure that the very high lifetime requirements of the joint (flexure) are met.

In any of the example implementations described throughout the present disclosure in which the feed is flexible, the feed may be bent within predefined elastic limits so as to not damage the feed during bending. The elastic limits may depend, for example, on one or more of a material out of which the feed is made, a cross-sectional shape of the feed, a thickness and/or length of the feed, etc.

In some examples, the flexible feed comprises a flexible waveguide. This may be particularly advantageous as the waveguide may be provided without a central or inner conductor, and can thus be easily manufactured. No power may be lost through radiation in the waveguide and even dielectric loss may be negligible.

In some examples of the antenna, the actuator unit comprises an actuator and a linkage, in particular a rod or bar, coupled to the actuator, wherein the linkage is coupled to one or more of the feed antenna, the secondary reflector and the feed, and wherein the actuator is configured to move the feed antenna and/or the secondary reflector, by pulling and/or pushing the feed antenna and/or the secondary reflector and/or the feed via the linkage, relative to the primary reflector.

This may allow for simple implementation in order to move the feed antenna and/or the secondary reflector (relative to the primary reflector).

In some examples of the antenna, the actuator unit comprises a plurality of actuators coupled to a single said linkage or coupled to corresponding, respective linkages, and wherein the actuator is configured to move the feed antenna and/or the secondary reflector, only by pulling the feed antenna and/or the secondary reflector and/or the feed via a said linkage, relative to the primary reflector. It may, in some examples, not be possible to move the feed antenna and/or the secondary reflector by pushing the feed antenna and/or the secondary reflector and/or the feed via a said linkage of the actuator unit. This may be advantageous as the linkage(s) may be made very light. The linkage(s) may hereby be made out of a material which is highly transparent to the used radio frequency.

In some examples of the antenna, the primary reflector comprises an opening through which the feed extends generally in a first direction, and wherein the actuator unit is configured to move, by exerting a said mechanical force on the feed antenna and/or the secondary reflector and/or the feed, the feed generally in a second direction which is perpendicular to the first direction. The feed antenna and/or the secondary reflector may thereby be moved relative to the primary reflector. The feed may hereby be flexible or not. In some examples, the part or end of the feed coupled to the radio-frequency transmission and/or reception device may be a fixed coupling between the feed and the radio-frequency transmission and/or reception device. The feed may be inflexible or, compared to other parts of the feed, relatively inflexible where the feed is coupled to the radio-frequency transmission and/or reception device. A longer feed may hereby be used so that the mechanical force may be exerted to a component of the antenna outside of a cavity formed by the primary reflector. Shorter flexible feeds made out of standard materials may be challenged to reach lifetimes at desired bending angles and repetitions, so also for flexible waveguides a longer feed may be preferable.

In some examples of the antenna, in which the feed is flexible, the antenna further comprises a rigid tube. In these examples, at least a part of the feed is arranged within the rigid tube. The rigid tube is coupled to a moveable portion of the feed. The actuator unit is coupled to the rigid tube, and wherein the actuator unit is configured to exert a rotational force or torque on the rigid tube for bending the flexible feed to move the feed antenna and/or the secondary reflector relative to the primary reflector. The rigid tube may be used in order to actuate the feed. In some examples, the actuator unit is arranged outside of an area, in particular a cavity formed by the primary reflector, through which a said electromagnetic wave travels. Therefore, any components of the actuator unit may be prevented from intersecting the aperture of the antenna where electromagnetic waves may travel.

In some examples of the antenna, the actuator unit comprises a lever via which the rotational force or torque is exertable on the rigid tube. This may be particularly advantageous, as the actuators may not need to be particularly powerful in order to ultimately move the feed antenna and/or the secondary reflector. This may result in low power consumption of the actuators.

In some examples of the antenna, a length of the feed is at least 1.2, preferably at least 1.5, and more preferably at least 2 times a length by which the feed extends through a cavity formed by the primary reflector. A longer feed may allow for the mechanical force to a component of the antenna to be exerted outside of a cavity formed by the primary reflector. Furthermore, in examples in which the feed is flexible, a longer feed may advantageously allow for lowering the bending forces and increasing cross polar isolation.

In some examples of the antenna, the feed comprises one or more protrusions, in particular in the form of a rib, a circle or a circular protrusion, arranged on an outer surface of the feed. In case a plurality of protrusions is used, the protrusions may be spaced apart from each other along the feed. Providing one or more protrusions may be particularly advantageous since it provides for stability of the feed where the one or more protrusions are arranged. Protrusions at the base (adjacent to where the feed is connectable to a radio-frequency transmission and/or reception device) may be particularly advantageous since bending stress may be largest at the base/fixed end of a cantilever bending beam/tube.

Furthermore, in examples in which the feed is flexible, the one or more protrusions prevent an inner cross section of the feed from changing (for example from a circle to something less circular, for example elliptical) when the feed is bent. Therefore, cross polar isolation may not be negatively affected based on keeping the shape of the inner cross section of the feed fixed due to the one or more protrusions.

In some examples, the protrusion(s) (e.g. ribs) may not be in direct contact with the rf in the main dish (since cavities may create frequency dependent amplitude variations in the transmission. Therefore, in some examples, the feed (e.g. waveguide) with outside protrusion(s) (e.g. ribs) may only be used with a rigid actuation tube (see above) covering it.

In some examples of the antenna, the feed comprises a plurality of protrusions, wherein a distance between neighboring ones of the protrusions is smaller at an end portion of the feed which is coupleable to the radio-frequency transmission and/or reception device compared to a said distance between neighboring ones of the protrusions at an end portion of the feed which is coupled to the feed antenna and/or secondary reflector. Additionally or alternatively, the feed comprises a said plurality of protrusions, and wherein a number density of the protrusions is smaller at the end portion of the feed which is coupleable to the radio-frequency transmission and/or reception device compared to a said number density of the protrusions at the end portion of the feed which is coupled to the feed antenna and/or secondary reflector. These examples may be particularly advantageous since the feed is more stable (less flexible) in the end portion which is coupleable to the radio-frequency transmission and/or reception device. The antenna may, in some examples, thus be particularly stable where the radio-frequency transmission and/or reception device is arranged, which radio-frequency transmission and/or reception device may, in some examples, be fixed in place.

In some examples of the antenna, a wall of an inner cavity of the feed is made of non-corrugated walls. Additionally or alternatively, the feed may have solid walls. Providing non-corrugated walls may allow for preventing unevenness/roughness inside the feed (which may be a hollow waveguide), so that polarization vibrations (disturbance in polarization/(unwanted) mode conversion) of signals travelling through the feed may be prevented or diminished. This may be particularly important when signals in the E-band (60 to 90 GHz) are transmitted via the feed.

In some examples, the feed comprises an elliptical cross-section, in particular wherein an aspect ratio between the longer (major) axis and the shorter (minor) axis is, in some examples, between 1 and 1.4 (in particular one of (or approximately one of) 1.05, 1.1, 1.15, . . . , 1.4). This allows the feed to be more robust against deformation based on a force acting on the feed.

In some examples, the feed comprises a rectangular cross-section, which allows the feed to be more robust against deformation based on a force acting on the feed. In some examples, the feed comprises one or more grooves and/or one or more ridges, which allows the feed to be more robust against deformation based on a force acting on the feed.

We further describe an antenna, in particular a parabolic antenna, comprising a primary reflector, in particular a parabolic dish, a feed antenna and/or a secondary reflector for transmitting and/or reflecting an electromagnetic wave towards the primary reflector and/or receiving a said electromagnetic wave reflected from the primary reflector. A flexible feed is coupled to the feed antenna and/or secondary reflector. The feed antenna and/or secondary reflector is coupleable, via the flexible feed, to a radio-frequency transmission and/or reception device. The feed antenna and/or the secondary reflector is movable relative to the primary reflector based on an actuator unit, coupleable to one or more of the feed antenna, the secondary reflector and the flexible feed, exerting a mechanical force on the feed antenna and/or the secondary reflector and/or the flexible feed for moving the feed antenna and/or the secondary reflector. The antenna may allow for steering the reflector antenna beam by bending the flexible feed. This may allow for compensating for movements of the antenna due to external influences (for example wind and/or the antenna heating up unevenly due to sunlight impinging only on one side of the antenna), as outlined above. The antenna may comprise any one or more features outlined above, i.e. in particular one or more of: a flexible waveguide, one or more protrusions arranged on an outer surface of the feed, an elliptical cross-section (having in particular an aspect ratio between a major axis and a minor axis of the elliptical cross-section of between (approximately) 1.05 and 1.4, in particular (approximately) 1.1, 1.15, 1.2, 1.25, 1.3 or 1.35), a rectangular cross-section, one or more grooves, and one or more ridges.

We further describe a system comprising an antenna according to any one of the example implementations as described herein, and an inertial measurement unit coupled to the antenna and configured to measure a physical movement of the antenna. The antenna is configured to compensate, based on said measurement of said physical movement by the inertial measurement unit, for said physical movement during beam steering by moving the feed antenna and/or the secondary reflector relative to the primary reflector by exerting, via the actuator unit, a said mechanical force on the feed antenna and/or the secondary reflector and/or the feed. The inertial measurement unit may be integral with the antenna. With this system, movements of the antenna due to external influences, as outlined above, may be compensated for.

In any one of the example implementations of the antenna described throughout the present disclosure, a shroud may be provided around the primary reflector. The shroud may allow for shielding the antenna from external influences, such as, but not limited to rain. Additionally or alternatively, the shroud may allow for shielding the antenna from electromagnetic waves which do not impinge on the antenna from the side to which the primary reflector is open. The shroud may also allow for shielding unwanted transmit sidelobes/off boresight emissions to comply to ETSI/FCC rules.

We further describe a method for compensating physical movement of an antenna during beam steering. The method comprises providing an antenna according to any one of the example implementations as described herein or a system according to any one of the example implementations as described herein. Physical movement data relating to a physical movement of the antenna is obtained. The method further comprises moving the feed antenna and/or the secondary reflector relative to the primary reflector, by exerting, via the actuator unit, a said mechanical force on the feed antenna and/or the secondary reflector and/or the feed, to compensate for said physical movement of the antenna. The physical movement data may be obtained via the inertial measurement unit or in another way (for example based on optical measurements of the antenna). The method may thus allow for compensating for movements of the antenna due to external influences, as outlined above.

In some examples, the method further comprises outputting compensation data relating to said compensation for said physical movement of the antenna. The compensation data may be stored for later use. The compensation data may be stored, for example, in a cloud environment or locally in the antenna. This compensation data may be used for mast/tower sway profiling of sites or regions and manufacturing or dimensioning of future products regarding their mechanical stability and/or a maximum steering angle and/or a maximum actuation speed.

In some examples of the method, said obtaining of said physical movement data comprises retrieving stored physical movement data generated previously. Depending on certain external conditions (for example a certain time of the day and/or season in the year), movement of the antenna may be compensated for proactively (i.e. ahead of when the antenna moves) by moving the feed antenna and/or the second reflector based on the previously retrieved (historical) physical movement data.

We further describe a method for steering a reflector antenna beam. The method comprises providing an antenna, in particular a parabolic antenna, comprising a flexible feed, in particular a flexible waveguide. The method further comprises steering the reflector antenna beam by bending the flexible feed. While this beam steering method may be used in order to compensate for external conditions and/or influences on the antenna, as outlined above, this method for beam steering may be advantageous without considering the compensation for movement of the antenna due to external influences since only a small part of the antenna (e.g. a feed antenna and/or a secondary reflector coupled to the flexible feed) may be moved. Only comparatively small forces may be required to steer the beam, thereby reducing power consumption of the antenna when changing the direction of the beam.

We further describe a method for providing data relating to a physical movement of an antenna due to external (environmental) influences on the antenna. The data may subsequently be used to adjust beam steering of, in particular, a main beam of the antenna in particular by changing a position of a feed antenna and/or a secondary reflector coupled to a flexible feed (e.g. flexible waveguide). This method may be based on using an antenna according to any one of the example implementations as described herein. Additionally or alternatively, this method may be combined with a method according to any one of the example implementations as described herein, in particular the above-described method for compensating physical movement of an antenna during beam steering and/or the method for steering a reflector antenna beam.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION

In most current backhaul antennas, a central feed (which is approximately a round tube) protrudes into the main reflector cavity nearly up to its focus. The small sub reflector is often attached to the feed. The present disclosure is, according to some examples, to make the feed flexible so that it could be bent by actuators repeatedly. By bending the feed, its end with the attached sub (secondary) reflector is moved in the area around the main (primary) reflector focus. This may cause the main beam of the antenna to change its direction according to the movement of the sub reflector. This beam steering can be used to mitigate mast sway and mast twist. The present disclosure relates in particular to steerable reflector antennas (of, for example, backhaul point-to-point microwave links) which compensate for link quality decreases introduced, for example, by wind induced mast sway.

In backhaul microwave links, there is a product evolution over time. Carrier frequencies become higher (now 80 GHz) and diameters of the largest used main reflector antennas become bigger. These factors intensify the negative impact of mast sway/twist on the microwave link quality. (Higher frequencies and larger main dishes make the main beam narrower.) Therefore, mast sway compensation solutions become more desirable. It is to be noted that the antenna according to example implementations described herein may be operated in the E-band, i.e. at frequencies between 60 and 90 GHz, in particular at 80 GHz.

Actual mast sway compensation solutions are much too expensive.

Because of wear out problems occurring due to high repetitions of movement over a lifetime of approximately 10 years, special consideration may have to be given to the design of joints. The present disclosure uses, in some examples, flexures as joints, because flexures, if designed accordingly, may withstand very high repetitions of movement.

In some examples, the waveguide is bent by connected linkages which are connected to actuators.

There are multiple different topologies which may allow for beam steering in particular in order to compensate for movement of the antenna due to external influences.

Figure 1:
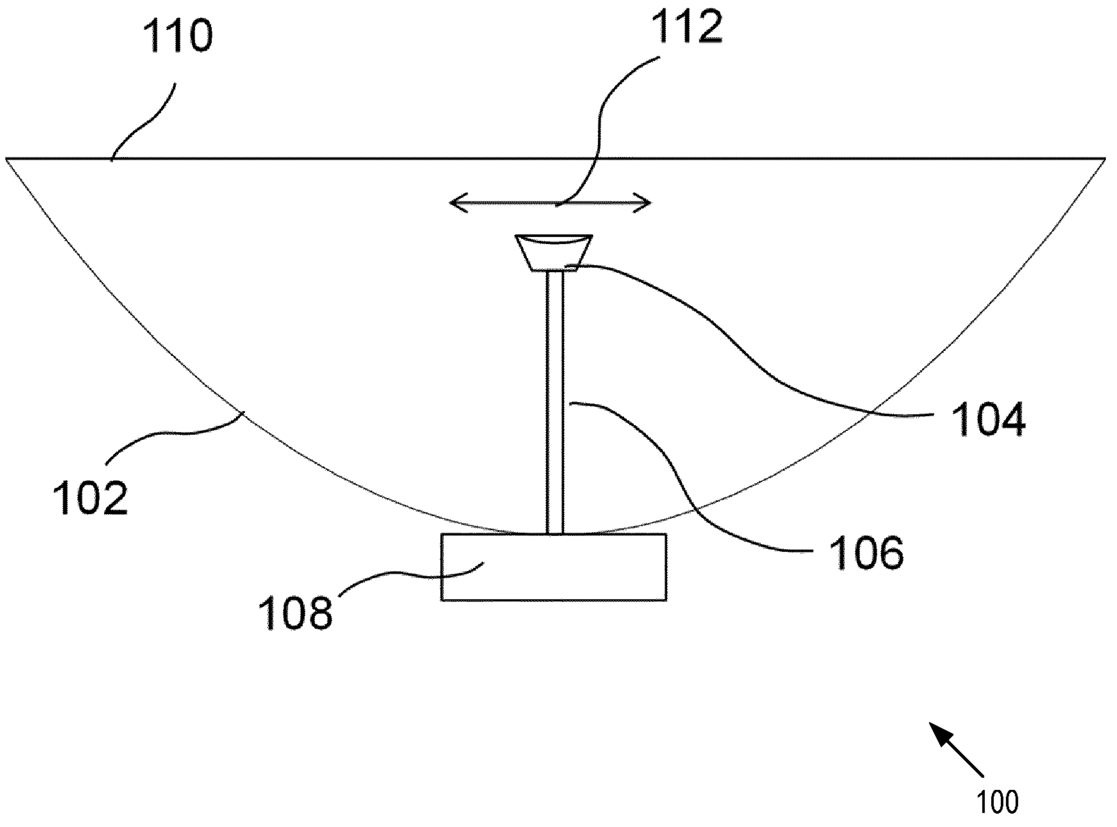
FIG. 1 shows a side cross-sectional view of a schematic illustration of an antenna according to some example implementations as described herein.

FIG. 1 shows a side cross-sectional view of a schematic illustration of an antenna 100 according to some example implementations as described herein.

In this example, the antenna 100 comprises a primary (main) reflector 102 in the form of a parabolic dish. A top hat retro reflector 104 (generally secondary reflector) with a dielectric is coupled, in this example, to a flexible waveguide 106. Instead of (or additionally to) a reflector 104, a feed antenna may be provided.

The top hat retro reflector 104 is coupled to a radio-frequency transmission and/or reception device 108.

Throughout the present disclosure, the “top hat retro reflector” may be (any kind of) a subreflector. Therefore, wherever the term “top hat retro reflector” is used, this may be replaced anywhere or everywhere throughout the present disclosure with “subreflector” (or generally secondary reflector).

Reference numeral 110 denotes the radome of the antenna.

The top hat retro reflector 104 is movable, in this example, in a direction generally perpendicular to a central axis of the primary reflector 102, as indicated by arrow 112.

Figure 2A:
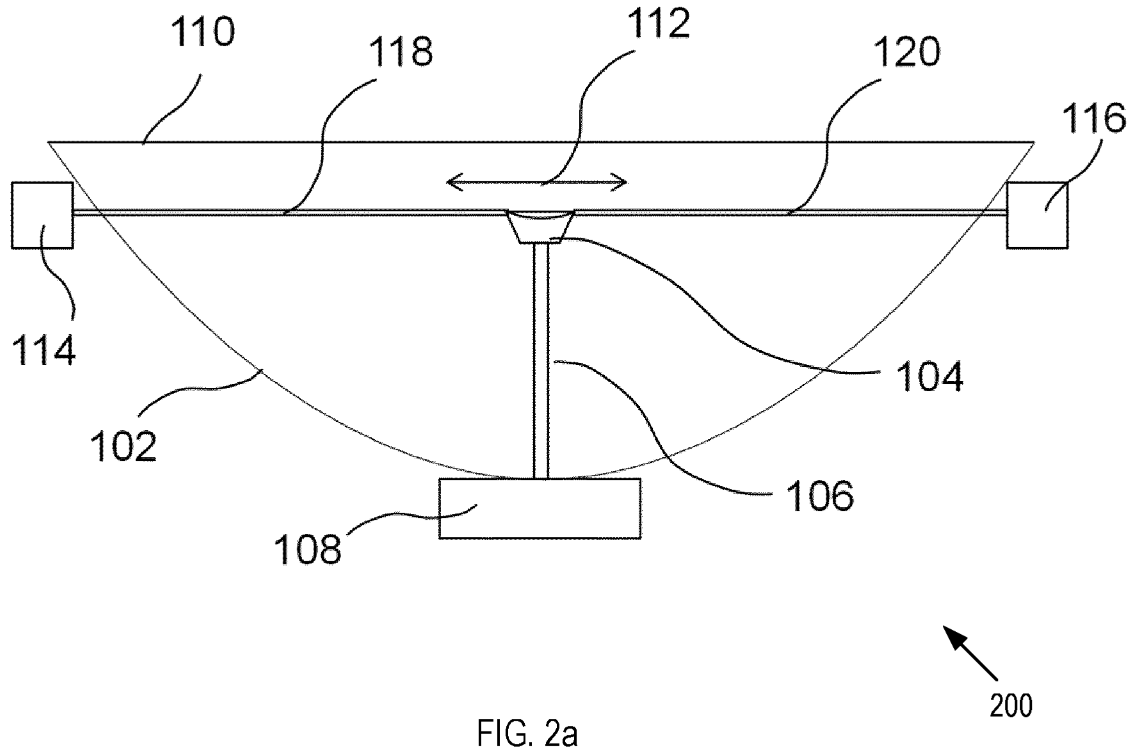
FIGS. 2*a* and *b* show a side cross-sectional view of a schematic illustration of an antenna according to some example implementations as described herein.

FIGS. 2*a* and *b* show a side cross-sectional view of a schematic illustration of an antenna 200 (which may be made in part of the antenna 100 of FIG. 1 as indicated using the same reference numerals) according to some example implementations as described herein.

In this example, the top hat retro reflector 104 is coupled to actuators 114 and 116, respectively, via corresponding, respective pull rods 118 and 120. The base of the actuators 114 and 116 is connected, in this example, to the base of the waveguide 106. This can be done, for example, by connecting them to the main reflector 102 (dish) or to a separate frame. In some examples, by letting the actuators 114 and 116 only pull and not push, the pull rods 118 and 120 can be made very light. The pull rods 118 and 120 may be made out of a material which has a high transparency (i.e. transparency above a predefined threshold) to the used radio frequency.

Figure 2B:
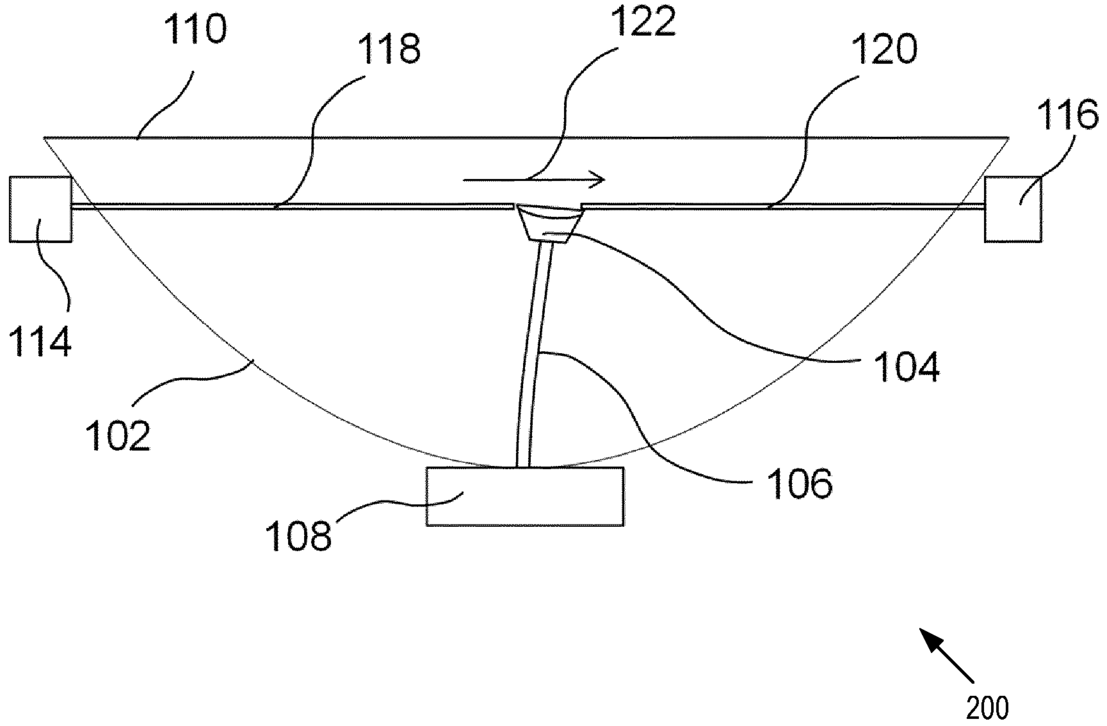

In FIG. 2*a*, the top hat retro reflector 104 is in a central position in relation to the cavity formed by the main reflector 102. As shown in FIG. 2*b*, the top hat retro reflector 104 is moved as indicated via arrow 122. This may be achieved by pulling on the top hat retro reflector 104 by the actuator 116 via the pull rod 120.

As FIGS. 2*a* and *b* show, in this example, there is only movement of the top hat retro reflector 104 in one dimension (say in the x-dimension). In some examples, actuators and pull rods may additionally be arranged orthogonally to the plane of the figure so that movement of the top hat retro reflector 104 in the y-dimension can be performed. There may, in some examples, be four actuator and pull rod groups equally angled at 90 degrees around the waveguide 106. One can also achieve full x- and y-direction movement of the waveguide 106 by placing three actuator and pull rod groups equally angled at 120 degrees around the waveguide 106. Other examples will be readily known to those with skill in the art.

Figure 3:
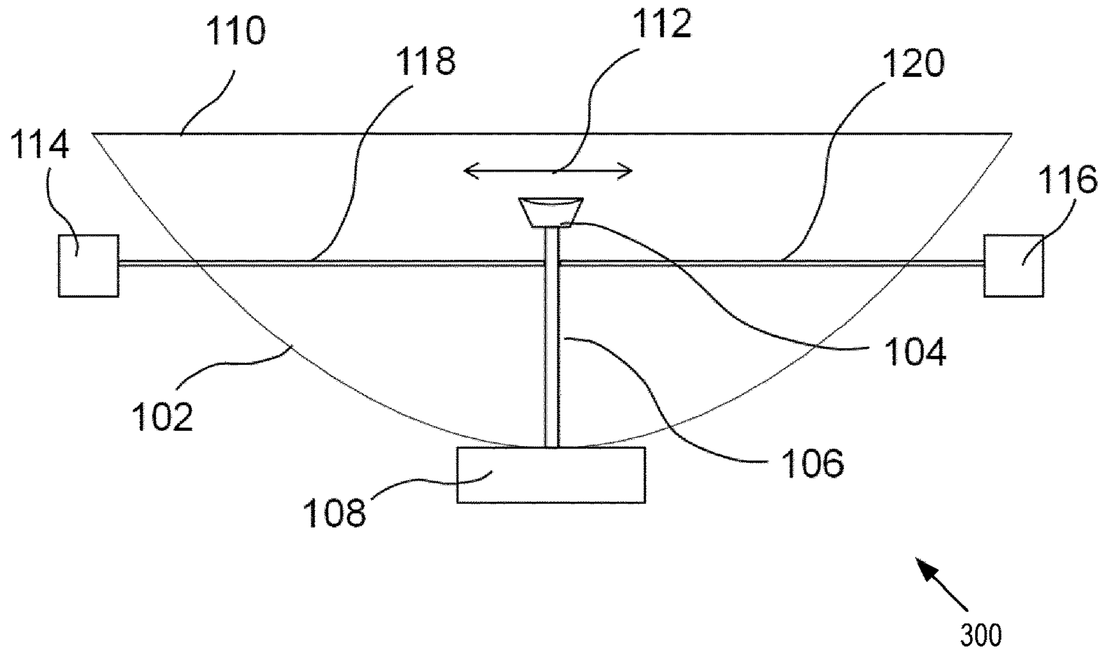
FIG. 3 shows a side cross-sectional view of a schematic illustration of an antenna according to some example implementations as described herein.

FIG. 3 shows a side cross-sectional view of a schematic illustration of an antenna 300 (which may be made in part of the antenna 100 and/or 200 of FIGS. 1 and 2 as indicated using the same reference numerals) according to some example implementations as described herein.

The antenna 300 shows a structure which slightly differs from antenna 200. The difference is that, in antenna 300, the pull rods 118 and 120 are coupled at the waveguide 106. The advantage is that the top hat retro reflector 104 (dielectric) (which may be made of plastic) does not have to bear the actuation forces. A drawback may be that the pull rods 118 and 120 are intersecting the radio waves two times instead of once. However, this may (at least partially) be compensated for by choosing a material for the pull rods 118 and 120 which are, as much as possible, transparent to the radio frequency used.

Figure 4:
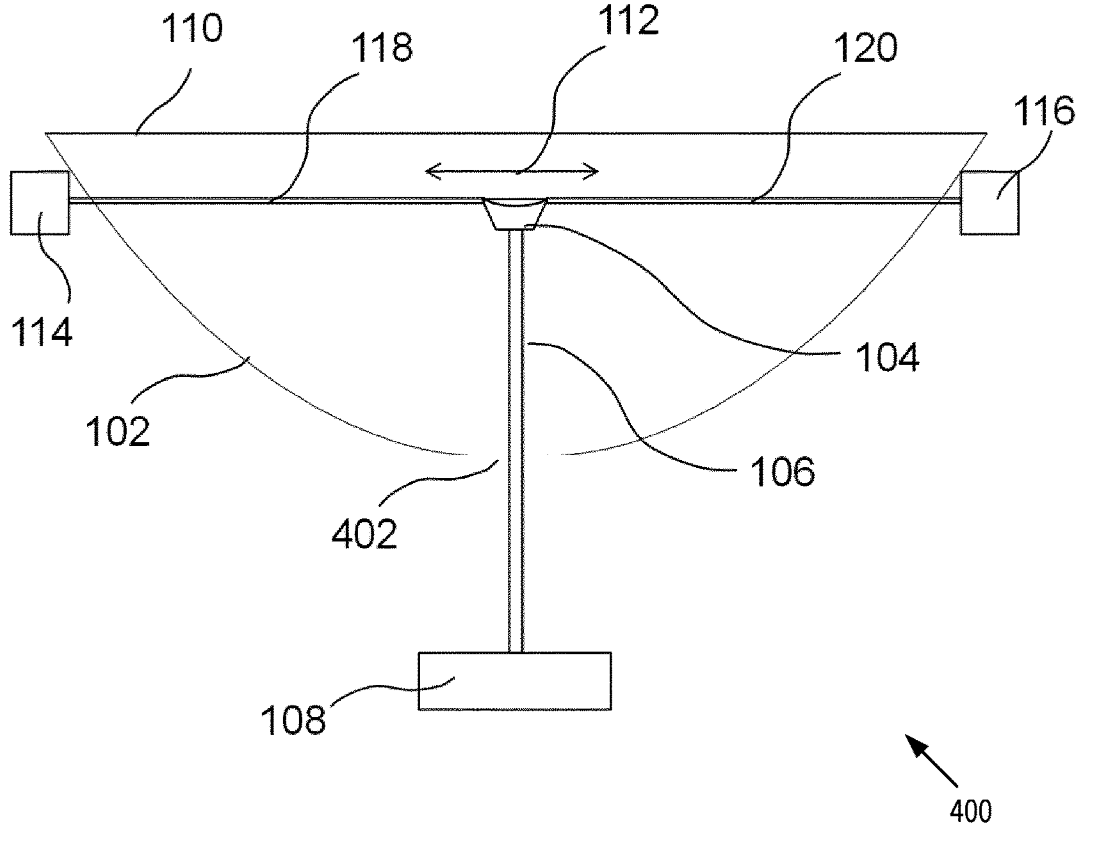
FIG. 4 shows a side cross-sectional view of a schematic illustration of an antenna according to some example implementations as described herein.

FIG. 4 shows a side cross-sectional view of a schematic illustration of an antenna 400 (which may be made in part of the antenna 100 and/or 200 and/or 300 of FIGS. 1, 2 and 3 as indicated using the same reference numerals) according to some example implementations as described herein.

The antenna 400 comprises a waveguide 106 which is longer than the waveguide used in antennae 100, 200 and 300. If a longer waveguide (with otherwise same parameters) is used, bending forces may be lowered and crosspolar isolation may be increased.

In this example, the antenna 400 further comprises an opening 402 provided at a lower part of the primary reflector 102, through which the waveguide 106 extends. In this example, by pulling via the actuators 114 and 116 on the top hat retro reflector 104 via the pull rods 118 and 120, respectively, the waveguide 106 also moves within the opening 402.

As will be appreciated, such an opening 402 may be provided in any one of the example implementations of the antenna as described throughout the present disclosure.

Figure 5A:
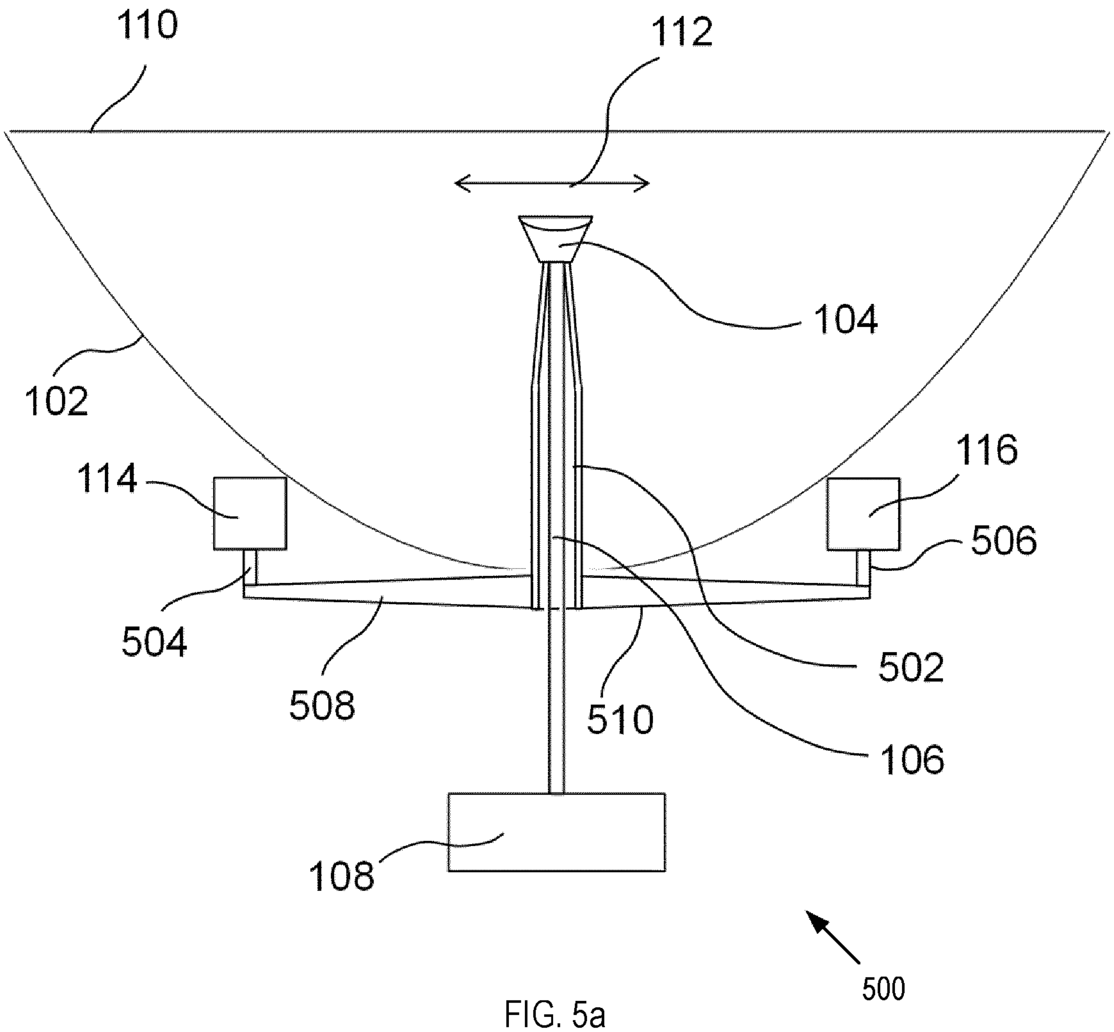
FIGS. 5*a* and *b* show a side cross-sectional view of a schematic illustration of an antenna according to some example implementations as described herein.
Figure 5B:
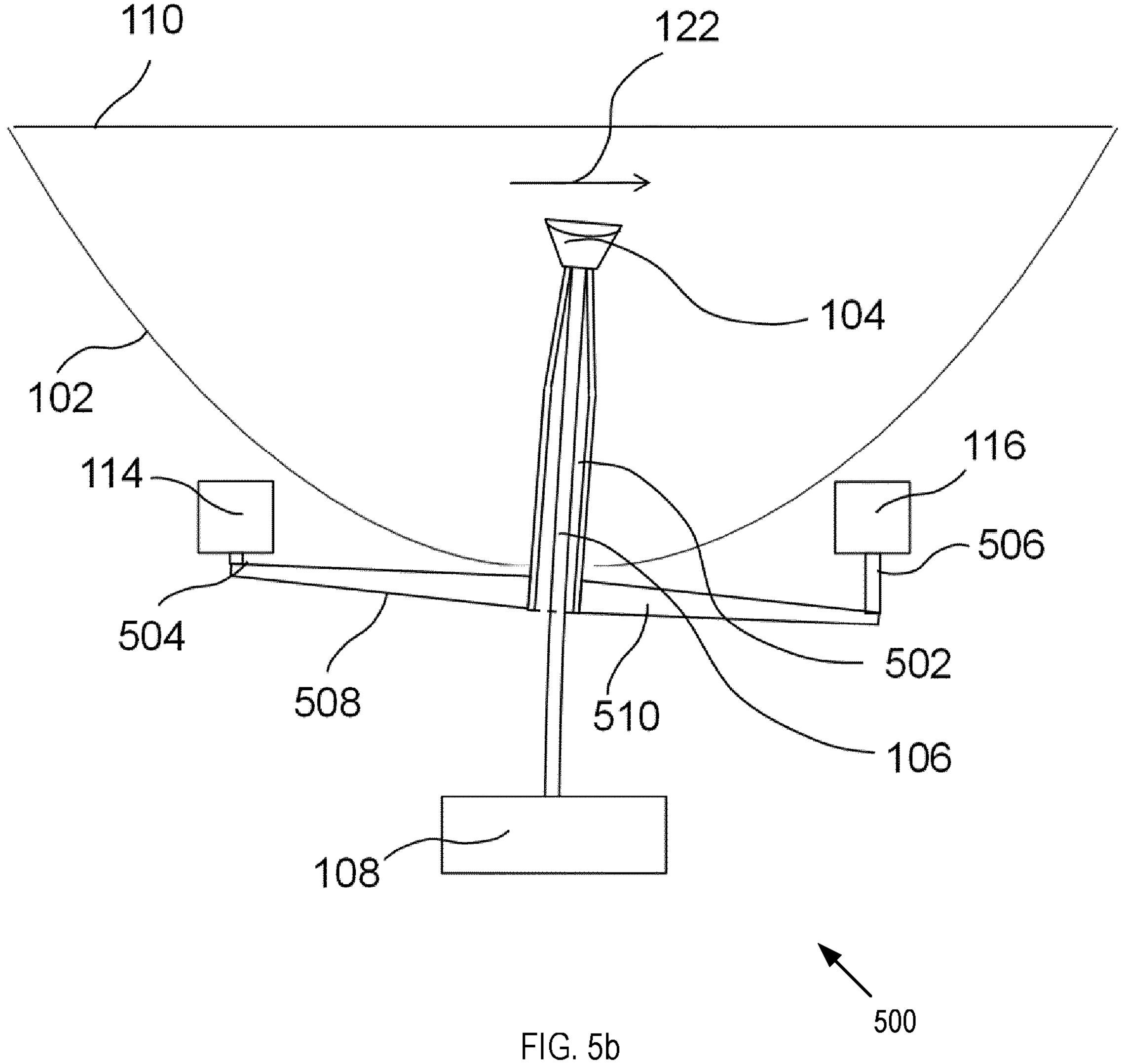

FIGS. 5*a* and *b* show a side cross-sectional view of a schematic illustration of an antenna 500 (which may be made in part of the antenna 100 and/or 200 and/or 300 and/or 400 of FIGS. 1, 2, 3 and 4 as indicated using the same reference numerals) according to some example implementations as described herein.

In this example, the antenna 500 comprises a rigid tube 502 within which a part of the waveguide 106 is arranged. The rigid tube 502 is coupled (attached) to the movable end of the waveguide 106. The rigid tube 502 is used in order to actuate the waveguide 106. Connecting rods 504 and 506 are coupled to the actuators 114 and 116, respectively. Furthermore, in this example, the connecting rods 504 and 506 are coupled to the rigid tube 502 via rigid actuation levers 508 and 510, respectively. On the base of the rigid tube 502, a rotational force/torque is introduced.

As can be seen, in the antenna 500, pull rods (i.e. rigid actuation levers 508 and 510) do not intersect the aperture of the antenna. In FIGS. 5*a* and *b*, rigid actuation levers 508 and 510 connected to actuators 114 and 116 are used to show one possible implementation; other implementations in which the actuator unit does not intersect the aperture of the antenna through which electromagnetic waves travel are possible.

Figure 6:
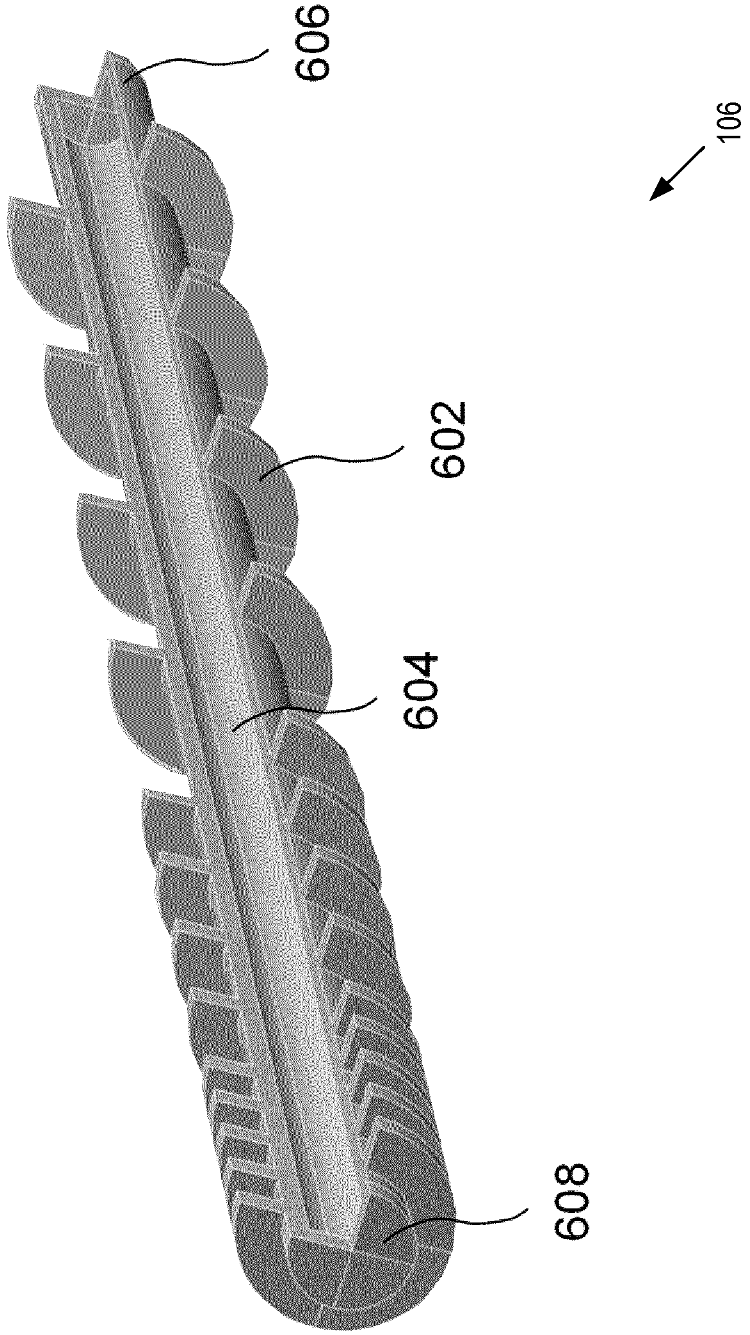
FIG. 6 shows a perspective view of a schematic illustration of a waveguide in a partially cut-open view according to some example implementations as described herein.

FIG. 6 shows a perspective view of a schematic illustration of a waveguide 106 in a partially cut-open view according to some example implementations as described herein.

The example of FIG. 6 shows a way to structure the outer wall of the waveguide 106 to prevent the inner cross section from changing from a circle to something less circular (maybe elliptical) when the waveguide 106 is bent. Having a non-circular cross section may potentially affect the cross polar isolation. The protrusions 602 (e.g. ribs) keep the inner cross section circular and the non-ribbed sections allow the waveguide 106 to be bendable.

The flexible waveguide 106 may, in some examples, have solid walls and the inner cavity 604 may have flat (non-corrugated) walls.

The end 606 of the flexible waveguide 106 is to be coupled to the top hat retro reflector. The end 608 is to be coupled to the base (e.g. the radio-frequency transmission and/or reception device and/or a frame of the antenna).

Bending of the waveguide may alter the shape of the inner cross section of the waveguide. If the orientations of the exploited waveguide modes are changed by such cross section deformation, energy leakage between the two modes can occur with poor cross polar isolation as a result.

Figure 7:
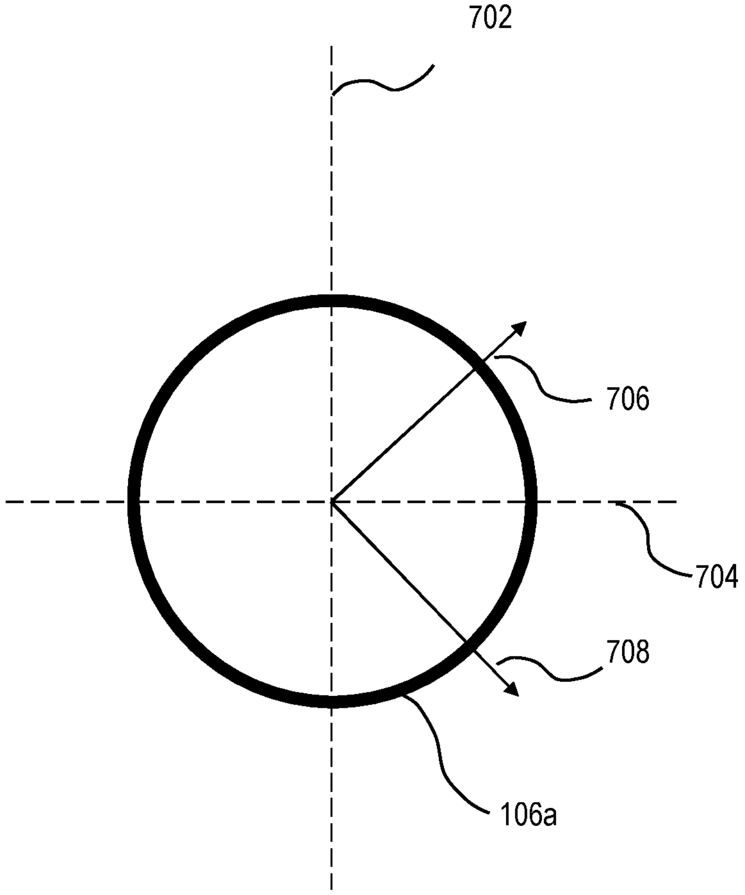
FIGS. 7 and 8 show a cross-sectional view of a schematic illustration of a circular waveguide in an undeformed and deformed state, respectively.

FIG. 7 shows a cross-sectional view of a schematic illustration of a circular waveguide 106*a*. It may be implemented in, for example, any one of the antennae of FIGS. 1 to 5.

Let the two exploited modes be oriented, e.g., along the 0 degrees (702) and 90 degrees (704) planes. The worst case bending direction at 45 degrees is then indicated via arrow 706, and the worst case bending direction at 135 degrees is indicated via arrow 708. When the waveguide 106*a* is bent, the circular cross section is deformed into a shape which may resemble an ellipse.

Figure 8:
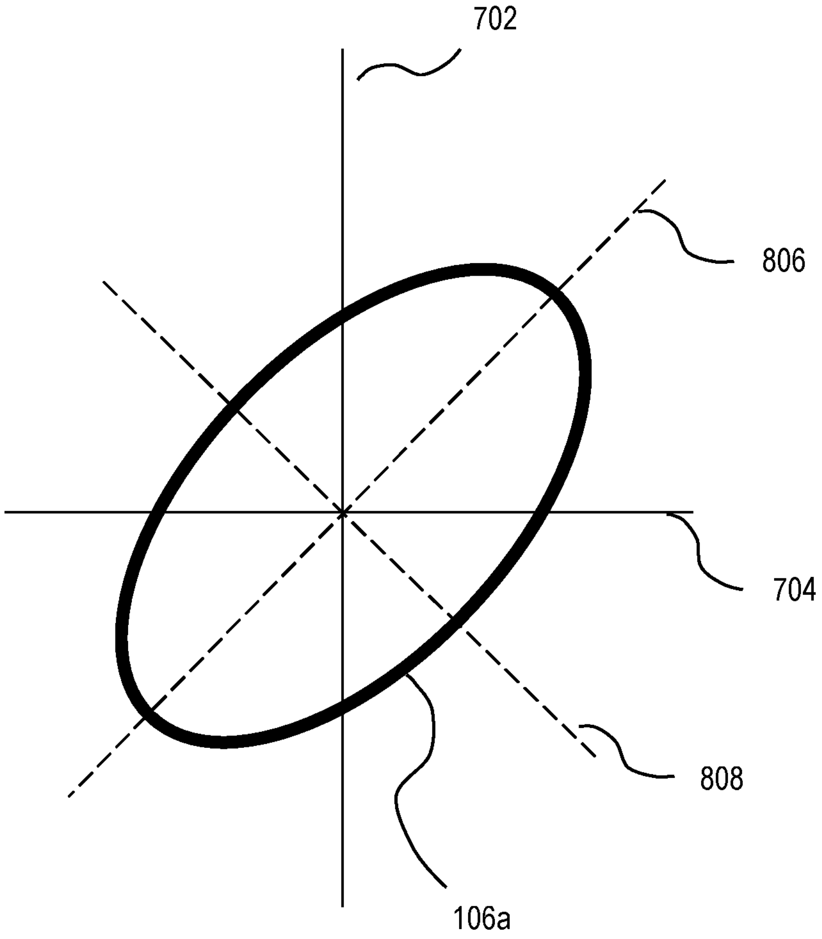

FIG. 8 shows a cross-sectional view of a schematic illustration of the waveguide 106*a* in the deformed (elliptical) shape. The ellipticity is, in this example, exaggerated for illustrative purposes.

For an elliptic cross section, the two modes are oriented along the major (806) and minor (808) axes of the ellipse. Consider the smallest angle between any of the two signal planes 702, 704 and the two axes 806, 808 of the ellipse. This angle will be between 0 and 45 degrees. For an angle of 0 degrees, cross polar isolation is not affected. In contrast, cross polar isolation degrades more and more for larger angles with the poorest cross polar isolation performance occurring for an angle of 45 degrees. This yields that the worst-case bending direction is 45 degrees, which is depicted in FIG. 8. Since only a slight deformation of the cross section suffices to shift the waveguide mode orientations substantially, the circular cross section may not be robust to deformations.

Figure 9:
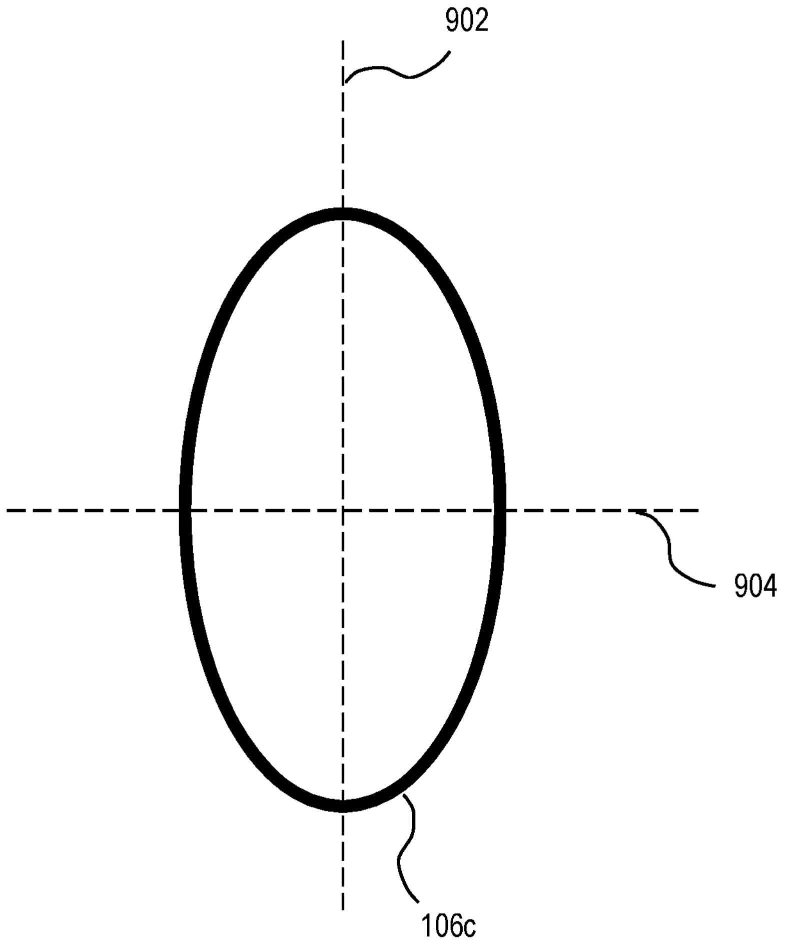
FIG. 9 shows a cross-sectional view of a schematic illustration of a further waveguide according to some example implementations as described herein.

It is thus proposed to use waveguides with cross sections that are robust to deformations. FIG. 9 shows a cross-sectional view of a schematic illustration of such a waveguide 106*c* according to some example implementations as described herein. It may be implemented in, for example, any one of the antennae of FIGS. 1 to 5.

In the example of FIG. 9, an elliptical cross section is used with its axes oriented along the signal planes. In this example, the ellipse major axis 902 is aligned with the 0 degrees signal plane, and the ellipse minor axis 904 is aligned with the 90 degrees signal plane.

If the elliptical cross section is made sufficiently "elliptic", i.e. the aspect ratio between the longer (major) axis and the shorter (minor) axis is, in some examples, between 1.05 and 1.4 (in particular 1.05, 1.1, 1.15, . . . , 1.4), bending-induced deformations of the cross section may lead to only minor rotations of the waveguide mode directions. Thus, cross polar isolation performance may drastically be improved compared to the circular waveguide.

Figure 10:
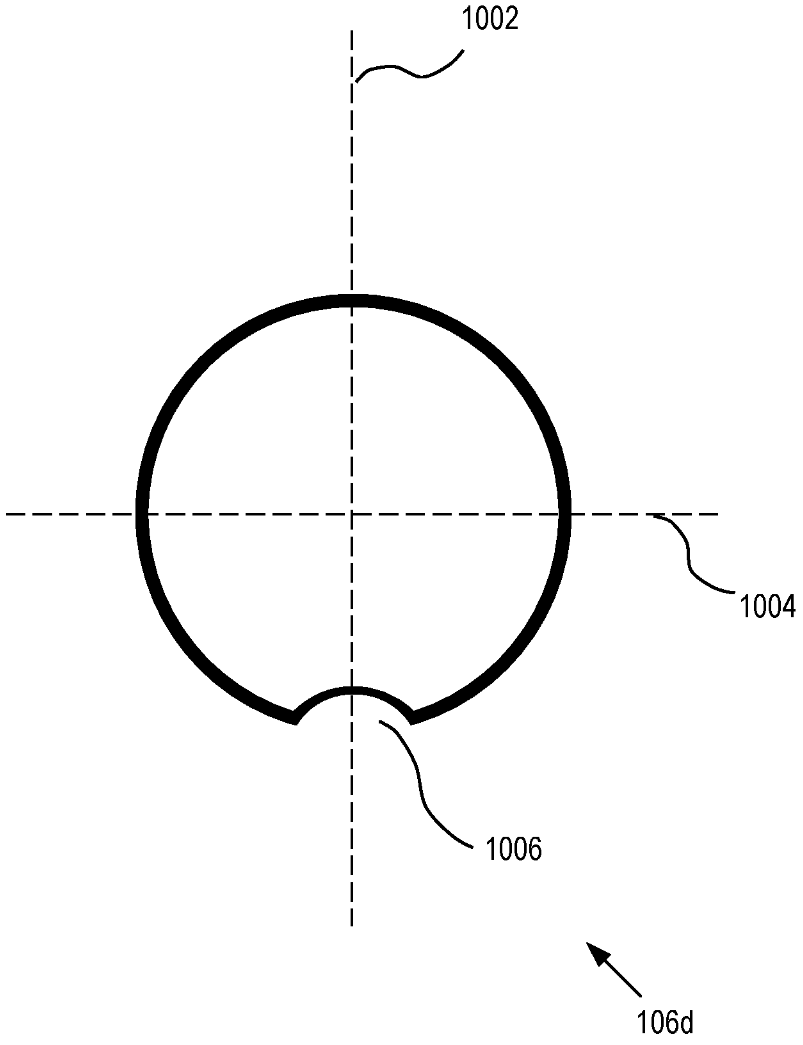
FIG. 10 shows a cross-sectional view of a schematic illustration of a further waveguide according to some example implementations as described herein.

Other examples of waveguides with cross sections that are robust to deformations include, for example, rectangular waveguides, waveguides with grooves and/or ridges etc. (may be implemented in, for example, any one of the antennae of FIGS. 1 to 5). FIG. 10 shows a cross-sectional view of a schematic illustration of a waveguide 106*d* (for which the 0 degrees signal plane 1002 and the 90 degrees signal plane 1004 are shown) with a ridge 1006, which may be implemented in, for example, any one of the antennae of FIGS. 1 to 5.

Different options in actuator placements may be exploited, as will be outlined in the following. FIGS. 11 to 15 show schematic illustrations of antennae according to some example implementations as described herein. This may be the antenna of any of the examples previously described.

Figure 11:
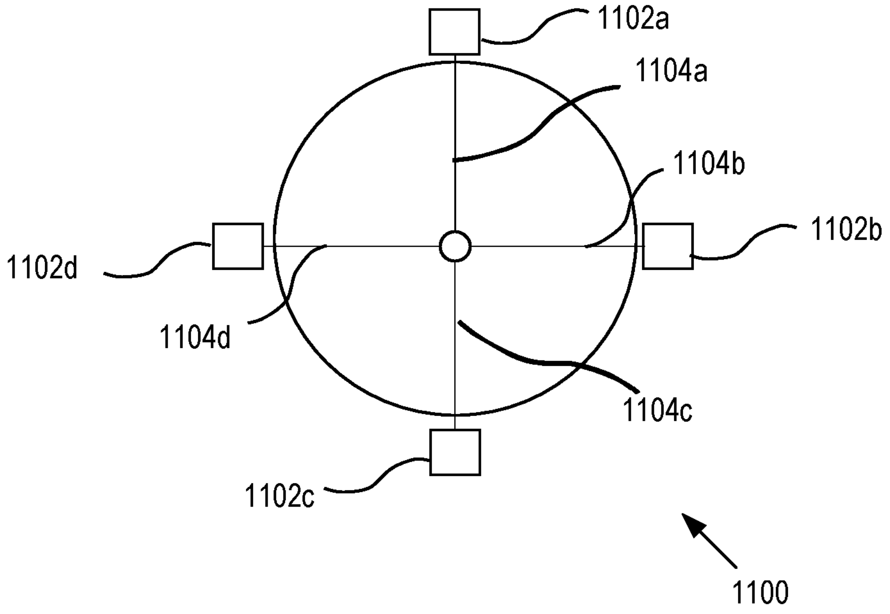
FIG. 11 shows a top view of a schematic illustration of an antenna according to some example implementations as described herein.

In FIG. 11, a front view of the antenna 1100 with a front actuated 4 actuator design with four pull rods 1104*a-d* for the respective actuators 1102*a-d* is shown.

Figure 12:
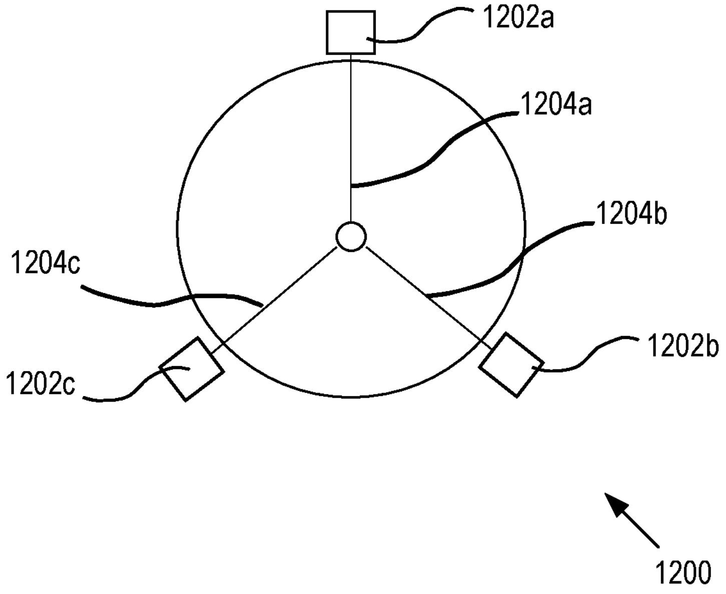
FIG. 12 shows a top view of a schematic illustration of an antenna according to some example implementations as described herein.

In FIG. 12, a front view of the antenna 1200 with a front actuated three actuator design with three pull rods 1204*a-c* for the respective actuators 1202*a-c* is shown.

Figure 13:
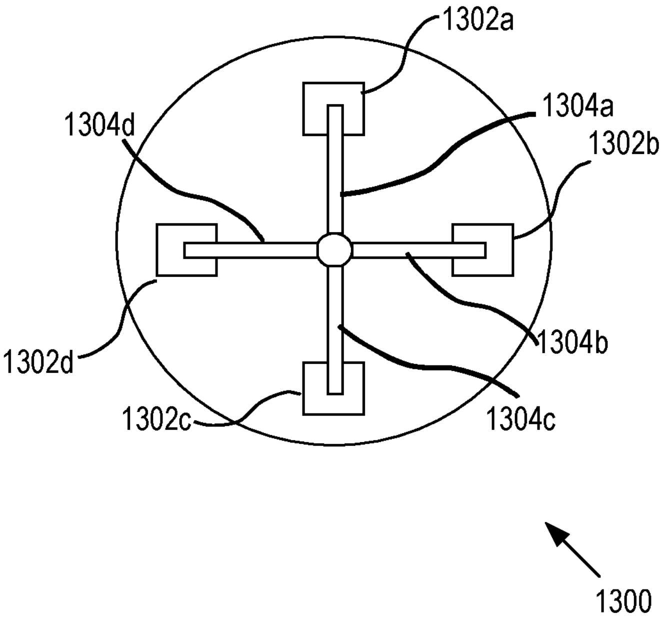
FIG. 13 shows a bottom view of a schematic illustration of an antenna according to some example implementations as described herein.

In FIG. 13, a back view of the antenna 1300 with a rigid tube back actuated four actuator design is shown. Levers 1304*a-d* are provided for the corresponding actuators 1302*a-d*.

Figure 14:
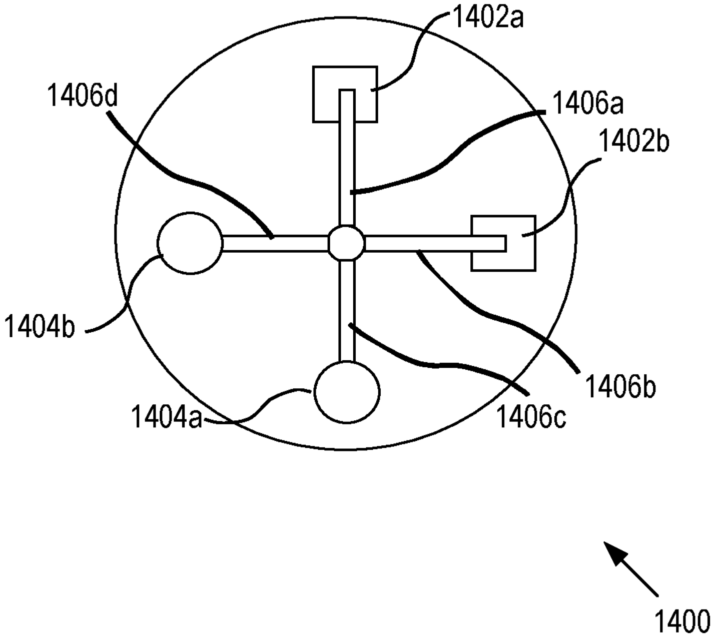
FIG. 14 shows a bottom view of a schematic illustration of an antenna according to some example implementations as described herein.

In FIG. 14, a back view of the antenna 1400 with a rigid tube back actuated two actuator and two counter bearings (e.g. implemented as springs/spring bearings) design is shown. In this example, levers 1406*a* and *b* are provided for actuator 1402*a* and *b*, respectively. Levers 1406*c* and *d* are provided for counter bearings 1404*a* and *b*, respectively.

Figure 15:
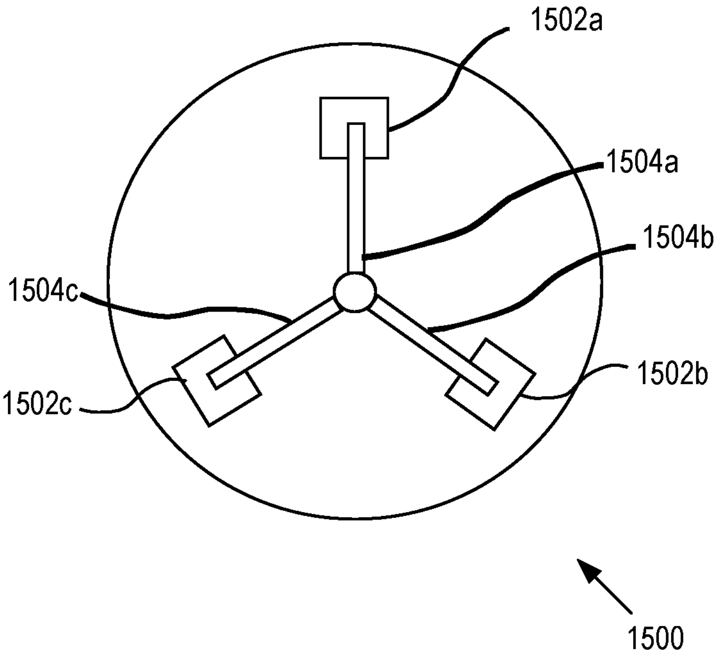
FIG. 15 shows a bottom view of a schematic illustration of an antenna according to some example implementations as described herein

In FIG. 15, a back view of the antenna 1500 with a rigid tube back actuated three actuator design is shown. Levers 1504*a-c* are provided for corresponding actuators 1502*a-c*.

The actuators may be implemented, in some examples, as voice coils. Some voice coils have built-in flexures to keep their armature from leaving the motion axis. For voice coils without flexures or without sufficiently dimensioned flexures, extra flexures may be added.

By having every moving component been held by a flexure, these components may reach a very high lifetime. Compared to traditional components like ball bearings, whose lifetime is especially low, if their range of motion in the product is so low that the ball bearing balls do not perform a full revolution. Thereby they wear off in a non-uniform way. Furthermore, lubrication of the ball bearing balls cannot be guaranteed in this situation.

Figure 16:
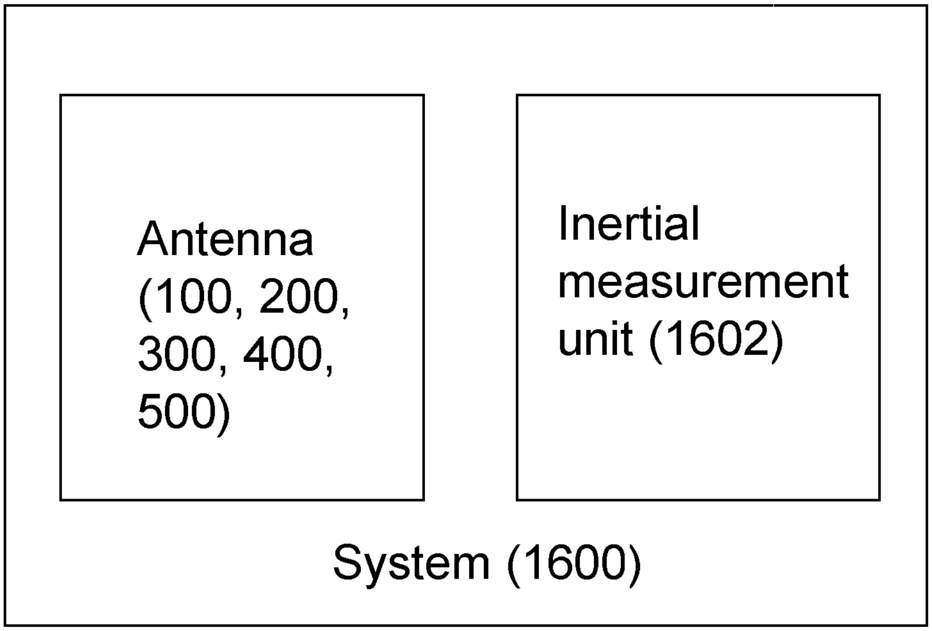
FIG. 16 shows a block diagram of a system according to some example implementations as described herein.

FIG. 16 shows a block diagram of a system 1600 according to some example implementations as described herein.

The system 1600 comprises, in this example, an antenna (e.g. antenna 100, 200, 300, 400, 500, or any other antenna as described throughout the present disclosure), and an inertial measurement unit 1602 coupled to the antenna and configured to measure a physical movement of the antenna. The antenna is, in this example, configured to compensate, based on a measurement of the physical movement by the inertial measurement unit, for the physical movement during beam steering by moving the feed antenna and/or the secondary reflector relative to the primary reflector by exerting, via the actuator unit, a mechanical force on the feed antenna and/or the secondary reflector and/or the feed.

Figure 17:
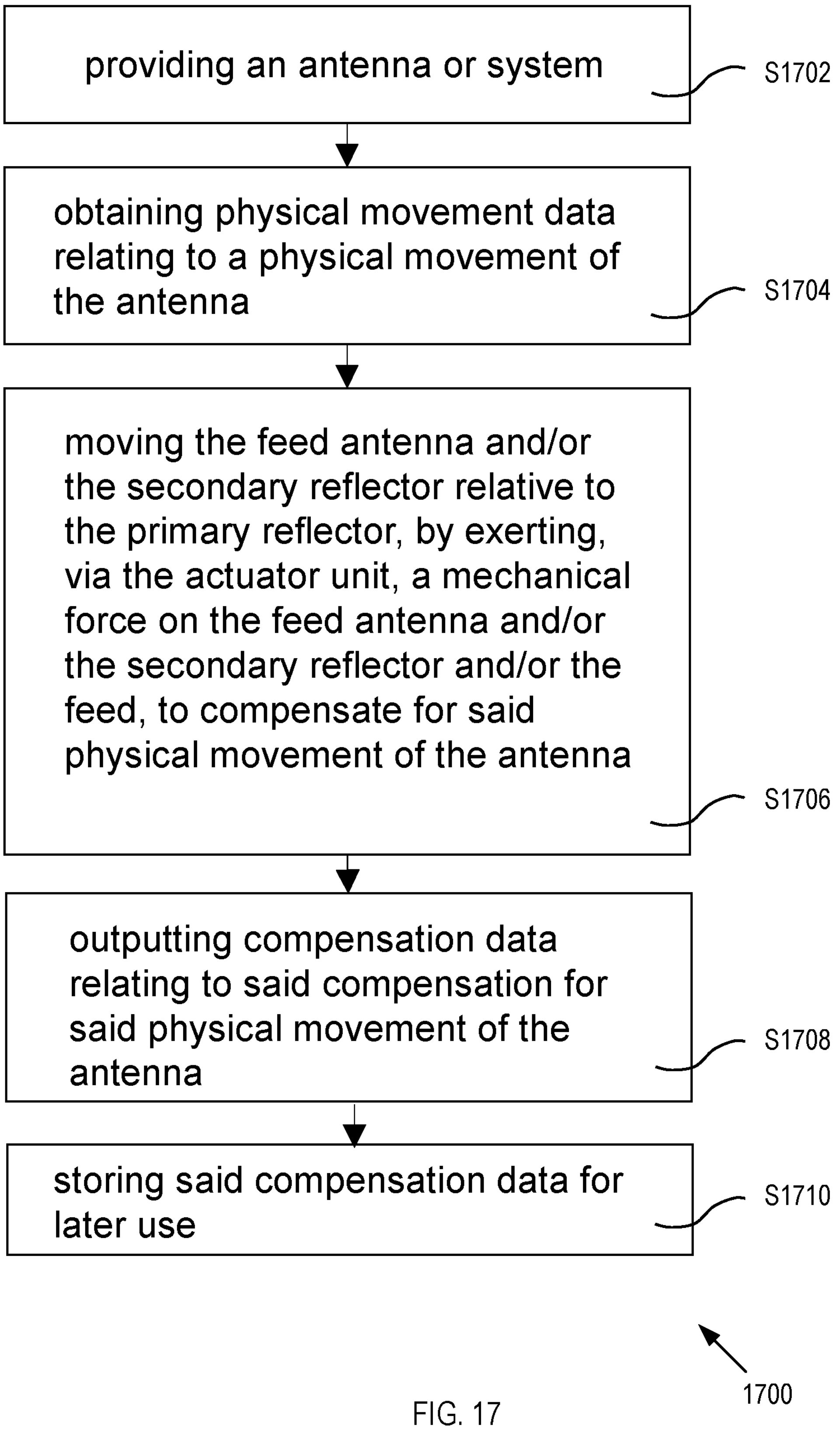
FIG. 17 shows a flow diagram of a method according to some example implementations as described herein.

FIG. 17 shows a flow diagram of a method 1700 for compensating physical movement of an antenna during beam steering according to some example implementations as described herein.

In this example, the method 1700 comprises, at step S1702, providing an antenna or system according to any one or more of the example implementations as described herein.

At step S1704, physical movement data relating to a physical movement of the antenna is obtained. This may be done by the inertial measurement unit 1602, or by other means (for example optically). Obtaining of the physical movement data may, in some examples, comprise retrieving stored physical movement data generated/obtained previously.

At step S1706, the feed antenna and/or the secondary reflector are moved relative to the primary reflector, by exerting, via the actuator unit, a mechanical force on the feed antenna and/or the secondary reflector and/or the feed, to compensate for the physical movement of the antenna.

In some examples, the method 1700 comprises, at step S1708, outputting compensation data relating to the compensation for the physical movement of the antenna, and, at step S1710, storing said compensation data for later use.

Figure 18:
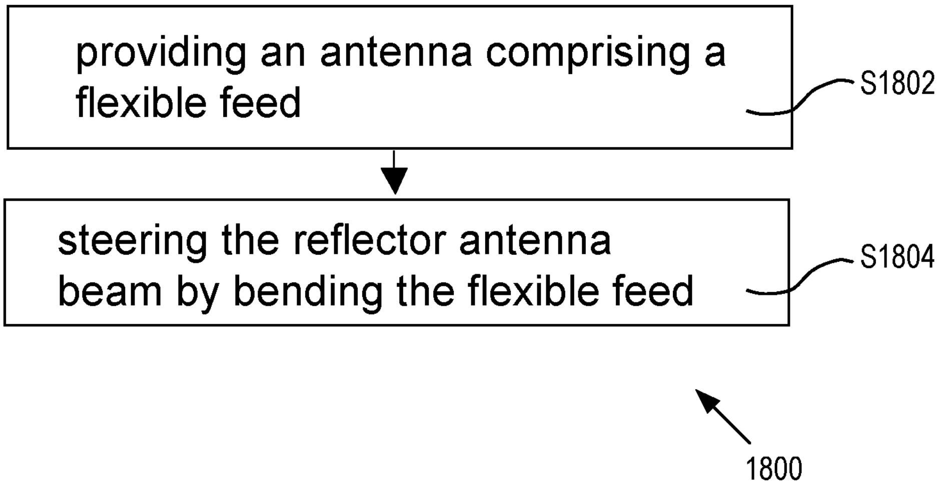
FIG. 18 shows a flow diagram of a method according to some example implementations as described herein.

FIG. 18 shows a flow diagram of a method 1800 for steering a reflector antenna beam according to some example implementations as described herein.

The method 1800 comprises, at step S1802, providing an antenna, in particular a parabolic antenna, comprising a flexible feed, in particular a flexible waveguide, in particular according to any one or more of the example implementations of the antenna and the system as described herein, and, at step S1804, steering the reflector antenna beam by bending the flexible feed.

In any of the example implementations as described herein, a Cloud Environment may be used to save data about the amount of movement measured by, e.g., the inertial measurement unit and the amount of compensation movement generated. Data could be used for mast/tower sway profiling of sites/regions and dimensioning/manufacturing of future products, in particular in relation to their mechanical stability and/or maximum steering angle and/or maximum actuation speed.

Advantages of (in particular a flexible feed for) beam steering according to the present disclosure are in particular:

- Only a very low mass (the mass of the feed (waveguide), small sub (i.e. secondary) reflector and actuator linkage) has to be moved by the actuators. When moving a low mass instead of a large mass, the actuators could be smaller, cheaper and consume less power. Furthermore, a smaller mass allows for faster movements to compensate faster mast sway motions.
- The whole actuation mechanics can be easily shielded from outside elements (e.g. rain) because of their small size and the fact that the (flexible) feed (e.g. waveguide) is inside the antenna which is already shielded by the radome against elements.
- By carefully designing the shape and material of the flexible waveguide, one can make sure that the very high lifetime requirements of the joint (flexure) are met.
- By designing the waveguide cross section (e.g. elliptic, ridge, groove, etc.) such that the orientations of the exploited waveguide modes are stable under deformations of the cross section caused by bending of the waveguide, the cross polar isolation performance of the waveguide can be improved especially in the worst case bending directions of 45 degrees and 135 degrees relative to the orientation of the waveguide modes.

As has been shown, some examples outlined herein relate in particular to a flexible waveguide that allows the feed of a reflector antenna to be moved away from the focal point to thereby steer the antenna beam. The flexible waveguide is bent within its flexible limits which allows virtually infinite lifetime.

No doubt many other effective alternatives will occur to the skilled person. It will be understood that the invention is not limited to the described embodiments and encompasses modifications apparent to those skilled in the art and lying within the scope of the claims appended hereto.

The invention claimed is:

1. An antenna, in particular a parabolic antenna, comprising:

a primary reflector, in particular a parabolic dish, a feed antenna and/or a secondary reflector for transmitting and/or reflecting an electromagnetic wave towards the primary reflector and/or receiving a said electromagnetic wave reflected from the primary reflector, a feed coupled to the feed antenna and/or secondary reflector, wherein the feed antenna and/or secondary reflector is coupleable, via the feed, to a radio-frequency transmission and/or reception device, and an actuator unit coupled to one or more of the feed antenna, the secondary reflector and the feed, wherein the actuator unit is configured to move the feed antenna and/or the secondary reflector, by exerting a mechanical force on the feed antenna and/or the secondary reflector and/or the feed, relative to the primary reflector, wherein the feed comprises a flexible feed which is configured to be bent based on the actuator unit exerting a said mechanical force on the feed antenna and/or the secondary reflector and/or the feed for moving the feed antenna and/or the secondary reflector relative to the primary reflector, wherein the antenna further comprises a rigid tube, wherein at least a part of the feed is arranged within the rigid tube, wherein the rigid tube is coupled to a moveable portion of the feed, wherein the actuator unit is coupled to the rigid tube, and wherein the actuator unit is configured to exert a rotational force or torque on the rigid tube for bending the flexible feed to move the feed antenna and/or the secondary reflector relative to the primary reflector.

2. The antenna as claimed in claim 1, wherein the feed extends along an axis normal or substantially normal to a surface of the primary reflector, and wherein the actuator unit is configured to move the feed antenna and/or the secondary reflector in a direction or plane perpendicular or generally perpendicular to the axis.

3. The antenna as claimed in claim 2, wherein the actuator unit is configured to move the feed antenna and/or the secondary reflector in one or two dimensions.

4. The antenna as claimed in claim 1, wherein the flexible feed comprises a flexible waveguide.

5. The antenna as claimed in claim 1, wherein the actuator unit comprises an actuator and a linkage, in particular a rod or bar, coupled to the actuator, wherein the linkage is coupled to one or more of the feed antenna, the secondary reflector and the feed, and wherein the actuator is configured to move the feed antenna and/or the secondary reflector, by pulling and/ or pushing the feed antenna and/or the secondary reflector and/or the feed via the linkage, relative to the primary reflector.

6. The antenna as claimed in claim 5, wherein the actuator unit comprises a plurality of actuators coupled to a single said linkage or coupled to corresponding, respective linkages, and wherein the actuator is configured to move the feed antenna and/or the secondary reflector, by pulling the feed antenna and/or the secondary reflector and/or the feed via a said linkage, relative to the primary reflector.

7. The antenna as claimed in claim 1, wherein the primary reflector comprises an opening through which the feed extends generally in a first direction, and wherein the actuator unit is configured to move, by exerting a said mechanical force on the feed antenna and/or the secondary reflector and/or the feed, the feed generally in a second direction which is perpendicular to the first direction, thereby moving the feed antenna and/or the secondary reflector relative to the primary reflector.

8. The antenna as claimed in claim 1, wherein the actuator unit is arranged outside of an area, in particular a cavity formed by the primary reflector, through which a said electromagnetic wave travels.

9. The antenna as claimed in claim 1, wherein the actuator unit comprises a lever via which the rotational force or torque is exertable on the rigid tube.

10. The antenna as claimed in claim 1, wherein a length of the feed is at least 1.2 times a length by which the feed extends through a cavity formed by the primary reflector.

11. The antenna as claimed in claim 1, wherein the feed comprises one or more protrusions, in particular in the form of a rib, a circle or a circular protrusion, arranged on an outer surface of the feed.

12. The antenna as claimed in claim 11, wherein the feed comprises a plurality of protrusions, and wherein a distance between neighboring ones of the protrusions is smaller at an end portion of the feed which is coupleable to the radio-frequency transmission and/or reception device compared to a said distance between neighboring ones of the protrusions at an end portion of the feed which is coupled to the feed antenna and/or secondary reflector.

13. The antenna as claimed in claim 11, wherein the feed comprises a said plurality of protrusions, and wherein a number density of the protrusions is higher at the end portion of the feed which is coupleable to the radio-frequency transmission and/or reception device compared to a said number density of the protrusions at the end portion of the feed which is coupled to the feed antenna and/or secondary reflector.

14. The antenna as claimed in claim 1, wherein a wall of an inner cavity of the feed is made of non-corrugated walls.

15. The antenna as claimed in claim 1, wherein the feed comprises an elliptical cross-section.

16. The antenna as claimed in claim 15, wherein an aspect ratio between a major axis and a minor axis of the elliptical cross-section is between 1.05 and 1.4.

17. The antenna as claimed in claim 1, wherein the feed comprises a rectangular cross-section.

18. The antenna as claimed in claim 1, wherein the feed comprises one or more grooves and/or one or more ridges.

19. An antenna, in particular a parabolic antenna, comprising:

a primary reflector, in particular a parabolic dish, a feed antenna and/or a secondary reflector for transmitting and/or reflecting an electromagnetic wave towards the primary reflector and/or receiving a said electromagnetic wave reflected from the primary reflector, a flexible feed coupled to the feed antenna and/or secondary reflector, wherein the feed antenna and/or secondary reflector is coupleable, via the flexible feed, to a radio-frequency transmission and/or reception device, and wherein the feed antenna and/or the secondary reflector is movable relative to the primary reflector based on an actuator unit, coupleable to one or more of the feed antenna, the secondary reflector and the flexible feed, exerting a mechanical force on the feed antenna and/or the secondary reflector and/or the flexible feed for moving the feed antenna and/or the secondary reflector, wherein the flexible feed is configured to be bent based on the actuator unit exerting a said mechanical force on the feed antenna and/or the secondary reflector and/or the flexible feed for moving the feed antenna and/or the secondary reflector relative to the primary reflector, wherein the antenna further comprises a rigid tube, wherein at least a part of the flexible feed is arranged within the rigid tube, wherein the rigid tube is coupled to a moveable portion of the flexible feed, wherein the actuator unit is coupled to the rigid tube, and wherein the actuator unit is configured to exert a rotational force or torque on the rigid tube for bending the flexible feed to move the feed antenna and/or the secondary reflector relative to the primary reflector.

20. A system comprising:

an antenna comprising:

a primary reflector, in particular a parabolic dish, a feed antenna and/or a secondary reflector for transmitting and/or reflecting an electromagnetic wave towards the primary reflector and/or receiving a said electromagnetic wave reflected from the primary reflector, a feed coupled to the feed antenna and/or secondary reflector, wherein the feed antenna and/or secondary reflector is coupleable, via the feed, to a radio-frequency transmission and/or reception device, and an actuator unit coupled to one or more of the feed antenna, the secondary reflector and the feed, wherein the actuator unit is configured to move the feed antenna and/or the secondary reflector, by exerting a mechanical force on the feed antenna and/or the secondary reflector and/or the feed, relative to the primary reflector, and an inertial measurement unit coupled to the antenna and configured to measure a physical movement of the antenna, wherein the antenna is configured to compensate, based on said measurement of said physical movement by the inertial measurement unit, for said physical movement during beam steering by moving the feed antenna and/or the secondary reflector relative to the primary reflector by exerting, via the actuator unit, a said mechanical force on the feed antenna and/or the secondary reflector and/or the feed, wherein the feed comprises a flexible feed which is configured to be bent based on the actuator unit exerting a said mechanical force on the feed antenna and/or the secondary reflector and/or the flexible feed for moving the feed antenna and/or the secondary reflector relative to the primary reflector, wherein the antenna further comprises a rigid tube, wherein at least a part of the flexible feed is arranged within the rigid tube, wherein the rigid tube is coupled to a moveable portion of the flexible feed, wherein the actuator unit is coupled to the rigid tube, and wherein the actuator unit is configured to exert a rotational force or torque on the rigid tube for bending the flexible feed to move the feed antenna and/or the secondary reflector relative to the primary reflector.

21. A method for compensating physical movement of an antenna during beam steering, the method comprising:

providing an antenna comprising:

a primary reflector, in particular a parabolic dish, a feed antenna and/or a secondary reflector for transmitting and/or reflecting an electromagnetic wave towards the primary reflector and/or receiving a said electromagnetic wave reflected from the primary reflector, a feed coupled to the feed antenna and/or secondary reflector, wherein the feed antenna and/or secondary reflector is coupleable, via the feed, to a radio-frequency transmission and/or reception device, and an actuator unit coupled to one or more of the feed antenna, the secondary reflector and the feed, wherein the actuator unit is configured to move the feed antenna and/or the secondary reflector, by exerting a mechanical force on the feed antenna and/or the secondary reflector and/or the feed, relative to the primary reflector;

obtaining physical movement data relating to a physical movement of the antenna; and moving the feed antenna and/or the secondary reflector relative to the primary reflector, by exerting, via the actuator unit, a said mechanical force on the feed antenna and/or the secondary reflector and/or the feed, to compensate for said physical movement of the antenna, wherein the feed comprises a flexible feed which is configured to be bent based on the actuator unit exerting a said mechanical force on the feed antenna and/or the secondary reflector and/or the flexible feed for moving the feed antenna and/or the secondary reflector relative to the primary reflector, wherein the antenna further comprises a rigid tube, wherein at least a part of the flexible feed is arranged within the rigid tube, wherein the rigid tube is coupled to a moveable portion of the flexible feed, wherein the actuator unit is coupled to the rigid tube, and wherein the actuator unit is configured to exert a rotational force or torque on the rigid tube for bending the flexible feed to move the feed antenna and/or the secondary reflector relative to the primary reflector.

* * * * *